April 14, 1970  A. M. TOMETSKO  3,506,237
PLASTIC ROTARY VALVE
Filed Aug. 12, 1968  2 Sheets-Sheet 1

INVENTOR
ANDREW M. TOMETSKO

BY *B. J. Schlesinger*
ATTORNEY

April 14, 1970     A. M. TOMETSKO     3,506,237

PLASTIC ROTARY VALVE

Filed Aug. 12, 1968     2 Sheets-Sheet 2

INVENTOR
ANDREW M. TOMETSKO

BY *[signature]*
ATTORNEY

United States Patent Office 3,506,237
Patented Apr. 14, 1970

3,506,237
PLASTIC ROTARY VALVE
Andrew M. Tometsko, Rochester, N.Y., assignor to Chemtrox Corporation, Rochester, N.Y., a corporation of New York
Filed Aug. 12, 1968, Ser. No. 751,897
Int. Cl. F16k 11/06, 31/02
U.S. Cl. 251—138                                    4 Claims

ABSTRACT OF THE DISCLOSURE

A valve mechanism, particularly useful for dispensing chemicals, is disclosed comprising three "Teflon" discs mounted one above another in contiguous relation. The center disc is rotatable relative to the topmost and lowermost discs to align a hole in this center disc with holes in the other two discs to permit dispensing a fluid or powder through the valve. Rotation of the center disc to open or close the valve can be effected by energizing and deenergizing a solenoid operating against a spring. To nest a plurality of units together, the solenoid housings, which carry the valves may be provided with interfitting tongues and grooves.

---

This invention relates to valves and more particularly to rotary valves.

A primary object of the present invention is to provide a rotary valve which is simple in construction and easy to operate. To this end, another object of the invention is to provide a rotary valve which comprises a minimum number of parts.

Another object of the invention is to provide a rotary valve particularly for use in the dispensing of chemicals which is made of parts that are not subject to corrosion and that are readily movable on one another to open or close the valve.

Other objects of the invention will be apparent hereinafter from the specification and from the recital of the appended claims particularly when read in conjunction with the accompanying drawings.

Figure 1:
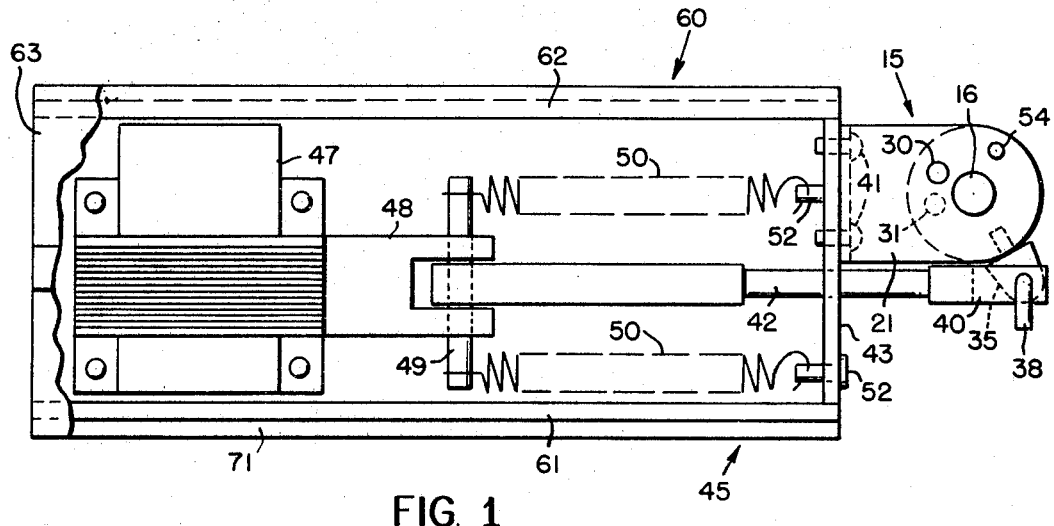
FIG. 1 is a plan view of a valve constructed according to one embodiment of this invention, showing, also, means for operating the same.

Referring now to the drawings by numerals of reference, the valve shown consists essentially of three discs 10, 11 and 12, mounted one above the other. The three discs are all preferably made of "Teflon" (tetrafluoroethylene) so that they are non-corrosive, can be assembled in contact with one another, and still be easily rotatable with reference to one another.

In one form, the valve is supported by a U-shaped bracket 15; and the valve parts are secured to the bracket by a bolt 16 and nut 17. The bolt passes through aligned holes 18, 19 and 20, respectively, in the three valve discs 10, 11, 12, and through the parallel arms 21 and 22 of the bracket and is held in place by the nut 17 which threads onto the bolt and abuts the lower face of the bracket arm 22.

In mounting the valve, bronze discs 25 and 26 are interposed between the arms 21 and 22, respectively, of the brackets; and gaskets 27 and 28 are interposed between the uppermost disc 10 and the bronze disc 25 and between the lowermost disc 12 and the bronze disc 26, respectively.

The discs 10, 11, 12 have holes 30, 31 and 32, respectively, through them, which are offset from their respective holes 18, 19 and 20 and which, when aligned, permit flow of material through the valve; but which, when non-aligned, stop such flow. Opening and closing of the valve is achieved by rotation of the center disc 11. For this purpose, a block 35 (FIG. 1) is provided, which is secured to disc 11 by a stud 36 that is integral with the block and that threads into a hole 37 in the periphery of disc 11.

The block 35 is connected by a readily manually removable right angularly shaped pin 38 with the bifurcated end 40 of a rod 42 which is reciprocable in the end plate 43 of a frame 45 which encloses a solenoid 47, whose armature 48 is connected by a pin 49 to rod 42. When the solenoid 47 is energized, the rod 42 is drawn to the left of FIG. 1 to revolve disc 11 to align its hole 31 with holes 30 and 31 in discs 10 and 12, respectively, and with aligned holes (not shown) in arm 21, bronze disc 25, gaskets 27 and 28, bronze disc 26, and arm 22 to provide a through passage through which the fluid, powder, or the like, which is to be dispensed, flows. When the solenoid is deenergized two springs 50, which are disposed, respectively, at opposite sides of the rod 42, return the rod 42 and the center disc 11 to the positions shown in FIG. 1. The two springs are connected, each, at one end to pin 49 and at the opposite end to a stud 52 which is secured in end plate 43.

The rotary motion of the center disc 11 is limited by a pin 54 which passes through a hole 55 in disc 10, an arcuate slot 56 in disc 11, a hole 57 in disc 12, and through holes (not shown) in arm 21, disc 25, gaskets 27 and 28, disc 26, and arm 22, that are aligned with holes 55 and 57 in discs 10 and 12. The arcuate slot 56, which is concentric with the bolt 19, permits limited movement of the disc 11 with relation to the discs 10 and 12. Pin 54 is readily removable manually from the discs by simply grasping its upper end and pulling it upwardly. It may have an enlarged head for this purpose.

The bracket 15 is secured to the front plate 43 of the solenoid housing by screws 41 that thread into the front plate 43.

The solenoid housing 60 comprises the front plate 43, side plates 61 and 62, top plate 63, and a bottom plate 64, and, if desired, a rear plate. These several plates may be made of plastic and fused, bonded, or otherwise secured to one another.

Figure 2:
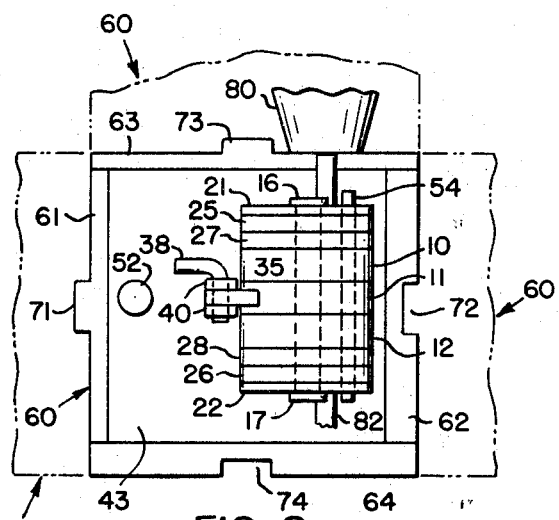
FIG. 2 is a front elevation of the valve and supporting structure.
Figure 3:
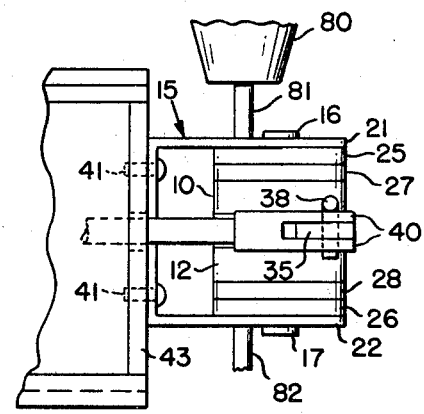
FIG. 3 is a fragmentary side elevation of the valve and supporting structure.
Figure 4:
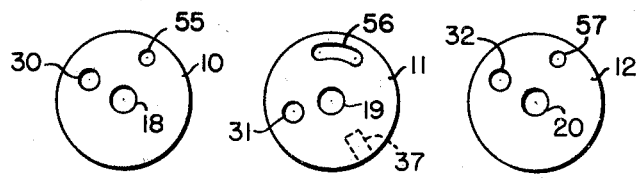
FIG. 4 is a side view showing the three main parts of the valve disassembled.

To permit nesting of a plurality of units with one another, in order to mount a plurality of valves in a minimum of space, the side plate 61 and the top plate 63 may be provided with longitudinal ribs 71 and 73, respectively, and the side plate 62 and the bottom plate 64 may be made with longitudinal grooves 72 and 74, respectively. Thus, a unit corresponding to that shown may be mounted on top of the unit shown by mating rib 73 of the top plate of one unit with the groove 74 in the bottom plate of another unit. Similarly, one unit, such as shown, may be mounted alongside a similar unit by engaging the rib 71 of the side plate 61 of one unit with the groove 72 in the side plate 62 of another unit, etc. This nesting is illustrated by the dotted line units shown in FIG. 2.

A bottle 80 containing a particular chemical may be mounted in any convenient position on the housing 60 and connected with the opening 30 in the disc 10 by a tube 81. The upper bronze disc 55 and the gasket 27, as stated above, have holes axially aligned with hole 30 in the disc 10. Likewise, as stated, the arm 22 of the bracket 15, the lower bronze disc 26, and the gasket 28 have holes aligned with the hole 32 in the disc 12. The rotatable valve disc 11 then will control the flow of material from the bottle 80. The discharge tubes 82 of several adjacent valves can be arranged to discharge into the same vessel so as to allow mixing of a plurality of chemicals in the given vessel, the proportions of the different chemicals being controlled by the several valves of the different valve units.

Figure 5:
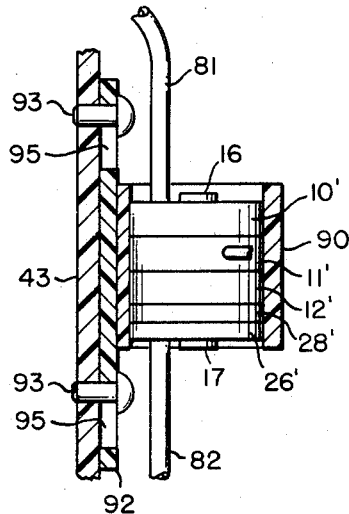
FIG. 5 is a fragmentary vertical sectional view showing a slightly modified form of a valve and its mounting.
Figure 7:
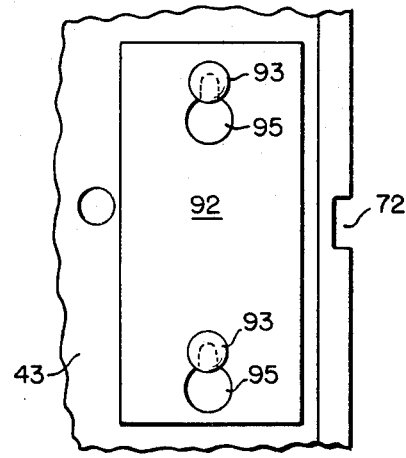
FIG. 7 is a sectional view on the line 7—7 of FIG. 6 looking in the direction of the arrows.
Figure 6:
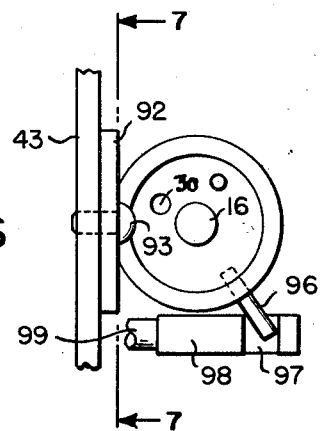
FIG. 6 is a fragmentary plan view of this valve and of means for mounting and operating the same.

A different embodiment of the invention is shown in FIGS. 5, 6 and 7. Here, the bracket 15, the upper bronze disc 25, and the gasket 27, are eliminated. Instead, three "Teflon" discs 10', 11', 12', similar, respectively, to discs 10, 11, 12, a gasket 28', similar to gasket 28, and a bronze disc 26', similar to disc 26, are mounted in a plastic sleeve 90 which is bonded in any suitable manner to a plastic plate 92. This plate in turn is removaly mounted on the front end plate 43 of the solenoid housing by screws 93, whose shanks engage in key hole slots 95 in the plate 92. The three "Teflon" discs 10', 11' and 12', the gasket 28' and the bronze disc 26' are secured together by bolt 16 which passes through the holes 18, 19 and 20 in the discs and threads into the nut 17 which abuts the lower face of the bronze disc 26'.

The discs 10', 11' and 12', gasket 28', and disc 26' are identical with the discs 10, 11, 12, gasket 28, and disc 26 of the first described embodiment of the invention except for the fact that they do not have holes therethrough for receipt of a pin 54. Center disc 11' may also be operated in a somewhat different manner from center disc 11, center disc 11' having a pin 96 projecting radially from it that engages in a notch 97 in the head 98 of a rod 99, similar to the rod 42, and connected in similar fashion to the armature of the solenoid 42.

Figure 8:
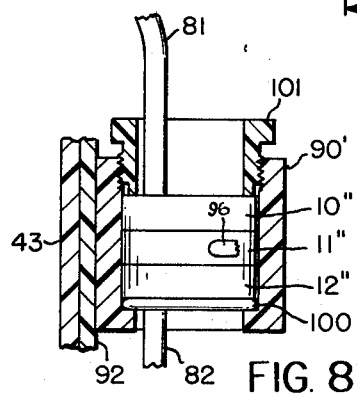
FIG. 8 is a fragmentary vertical sectional view of a still further embodiment of the invention.
Figure 9:
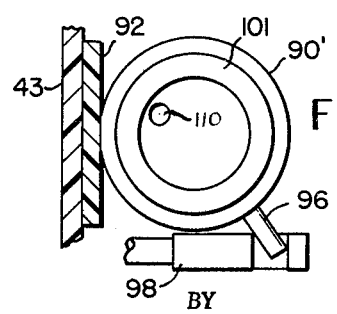
FIG. 9 is a fragmentary plan view of this last embodiment of the invention, showing, also, means for mounting and operating the valve.

A still further embodiment of the invention is illustrated in FIGS. 8 and 9. Here even the lower gasket 28 or 28' and the bronze disc 26 or 26' are eliminated. Here "Teflon" discs 10", 11" and 12", similar to discs 10, 11 and 12, are mounted in a plastic sleeve 90' and are held from falling out of the sleeve by a rubber O-ring 100 which is seated on a shoulder formed internally at the botom of sleeve 90'. The lowermost disc 12' rests on the O-ring. Sleeve 90' is bonded to a plate 92, like the plate 92 previously described; and this plate, in turn, is removably mounted, on a plate 43, in a manner similar to the mounting of plate 92 in the previously described embodiment of the invention.

Discs 10" and 12" are held against rotation in sleeve 90' by keys (not shown) which connect these discs with the sleeve, while disc 11" is rotatable in the sleeve, in the manner of disc 11 in sleeve 90', through a pin 96 fastened to disc 11" and engaging in slot 97 in the head 98 of rod 99.

Each of discs 10", 11", 12" has a hole 110 through it. The holes 110 in discs 10" and 12" are aligned. When the hole 110 in the disc 11" is aligned with the corresponding holes in discs 10" and 11", material can flow from tube 81 through the several discs of the valve to tube 82. When disc 11" is rotated to move its hole 110 out of alignment with the corresponding holes in the other two discs flow is shut off.

A centrally-bored cap 101, that threads adjustably into the bore of sleeve 90', permits of putting a desirable amount of tension on the discs to prevent too free movement of disc 11" relative to the other two discs.

Obviously, the invention can be used for dispensing either fluids or powders.

Having thus described my invention, what I claim is:
1. The combination with a rotary valve comprising a first plastic housing,
three plastic discs mounted within said housing in contiguous relationship one above another, said first housing having a cylindrical bore fitting closely about said discs, the central disc of said three discs being rotatable, and the other two discs being stationary, each disc having a hole through it, the hole in said central disc in the closed position of said valve being out of alignment with the holes in the other two discs, said central disc being rotatable to align its hole with the holes in the other two discs to open said valve,
of means for operating said valve, comprising a solenoid,
means operatively connecting said solenoid to said central disc in one direction when said solenond is energized, and
spring means for rotating said central disc in the opposite direction when said solenoid is deenergized, and
a second housing which houses said solenoid, and
a plastic plate to which said first housing is rigidly bonded and which is removably mounted on the front of said second housing.

2. The combination claimed in claim 1, wherein said plate has a keyhole slot therein, and said plate is removably mounted on the front of said second housing by a stud having a head removably engageable in said keyhole slot.

3. A rotary valve as claimed in claim 1, wherein a cap is threaded adjustably in the bore of said housing to engage the uppermost disc to adjust the frictional resistance to rotation of said central disc.

4. A rotary valve as claimed in claim 1, wherein said housing has an internal shoulder at the bottom of its bore,
a resilient O-ring is seated on said shoulder, and the lowermost disc seats on said O-ring.

References Cited

UNITED STATES PATENTS

| 2,736,151 | 2/1956 | McKenzie | 251—138 XR |
| 3,026,899 | 3/1962 | Mischanski | 137—375 |
| 3,117,587 | 1/1964 | Willinger | 251—367 XR |
| 3,313,317 | 4/1967 | Mosier | 251—138 XR |

FOREIGN PATENTS

| 193,256 | 9/1923 | Great Britain. |
| 920,710 | 3/1963 | Great Britain. |

HENRY T. KLINKSIEK, Primary Examiner

U.S. Cl. X.R.

251—304